United States Patent

Daffron

[11] 3,760,841
[45] Sept. 25, 1973

[54] CONTROL VALVE
[75] Inventor: Vernon M. Daffron, Ellisville, Mo.
[73] Assignee: Wagner Electric Corporation, Newark, N.J.
[22] Filed: July 12, 1972
[21] Appl. No.: 271,183

[52] U.S. Cl. ............... 137/493, 303/6 C, 137/493.7
[51] Int. Cl. .......................... B60f 8/26, F16k 15/02
[58] Field of Search ................ 137/494, 102, 493.3, 137/512.2, 516.25, 625.39, 630, 493, 517, 512.1, 493.7, 493.9; 303/6 C; 188/152, 349; 60/54.5

[56] References Cited
UNITED STATES PATENTS

| | | | |
|---|---|---|---|
| 3,278,241 | 10/1966 | Stelzer | 303/6 C |
| 3,492,052 | 1/1970 | Klimek | 303/6 C |
| 3,499,688 | 3/1970 | Reynolds | 303/6 C |

*Primary Examiner*—Henry T. Klinksiek
*Assistant Examiner*—Robert J. Miller
*Attorney*—James R. Bell

[57] ABSTRACT

A control valve for use in a hydraulic brake system is provided with a proportioning valve generally operable in response to fluid pressure supplied thereto between first and second predetermined values to effect the application through said control valve of an applied fluid pressure in a first predetermined ratio with the supplied fluid pressure, and a resiliently urged piston is responsive to supplied fluid pressure in excess of the second predetermined value to engage said proportioning valve and effect a second predetermined ratio between the supplied and applied fluid pressure, said piston and proportioning valve being responsive to supplied fluid pressure in excess of a third predetermined value to blend the supplied and applied fluid pressures.

6 Claims, 3 Drawing Figures

PATENTED SEP 25 1973 3,760,841

3,760,841

CONTROL VALVE

FIELD OF THE INVENTION

This invention relates generally to hydraulic brake systems and in particular to control valves for use therein.

BACKGROUND OF THE INVENTION

In the past vehicle hydraulic brake systems, the braking capacity between the front and rear axle brakes of a truck or other like vehicle was usually balanced or divided so that the front axle brakes accomplished 25 to 35 percent of the braking effort and the rear axle brakes accomplished the other 65 to 75 percent of such braking effort. Due to the Newtonian mechanics of decelerating or stopping a vehicle which involves the vehicle length of wheel base, static load distribution, and the height of the vehicle center of gravity from the roadbed, etc., the potential torque increase or increased braking effort of the front axle brakes due to high deceleration vehicle stops can be of such magnitude as to result in front to rear axle brake balance, or redistribution of such brake balance, in the range of 50 percent for the front axle brakes and 50 percent for the rear axle brakes or perhaps even greater. In order to take advantage of the front to rear axle brake torque redistribution, front axle brakes having the capacity to accommodate such redistribution must be provided on the vehicle, such as front axle brakes having significantly greater torque or braking effort generating potential. When the front axle brakes having the aforementioned significantly greater torque or braking effort generating potential was provided on the vehicle, the aforementioned redistribution of front to rear axle braking efforts effected during rather high vehicle decelerations resulted in the following undesirable or disadvantageous features: (1) an increasing tendency for early front wheel skidding; (2) a deleterious affect on vehicle steerability; (3) a deleterious imposition of increased loads or forces on the vehicle front suspension components during braking; and (4) a deleterious imposition of significantly increased loads on the vehicle front tires during braking which results in premature front tire wear. From the foregoing, it is apparent that high levels of front axle brake torque are required to produce high vehicle deceleration rates, but high levels of front axle brake torque can only be utilized if high vehicle decelerations were actually produced; however, this apparent paradox was due to the fact that high vehicle deceleration rates were required to effect sufficient weight transfer to the front axle to effect the utilization of the large magnitude of front axle torque.

The principle object of the present invention is to provide a control valve for use in a vehicle hydraulic brake system to predeterminately reduce fluid pressure applied to the vehicle front axle brakes which overcomes the aforementioned disadvantageous or undesirable features, and this, as well as other objects and advantageous features of the present invention, will become apparent from the specification which follows.

SUMMARY OF THE INVENTION

Briefly, the present invention includes a control valve for use in a hydraulic brake system having means for modulating supplied hydrulic pressure therethrough to establish a reduced applied pressure in a predetermined ratio with the supplied pressure, and resiliently urged means responsive to the supplied fluid pressure and engagable with said first named means to predeterminately alter the predetermined ratio under preselected conditions.

RELATED PATENTS

This patent application is related to United States Patent No. 3,492,052 issued Jan. 27, 1970 to B. Klimek and to U.S. Pat. No. 3,278,241 issued Oct. 11, 1966 to W. Stelzer, but this patent application is a patentably distinct improvement.

BRIEF DESCRIPTION OF THE DRAWINGS

In the drawings which illustrate an embodiment of the present invention and wherein like numerals refer to like parts wherever they occur.

DETAILED DESCRIPTION OF THE INVENTION

Figure 1:
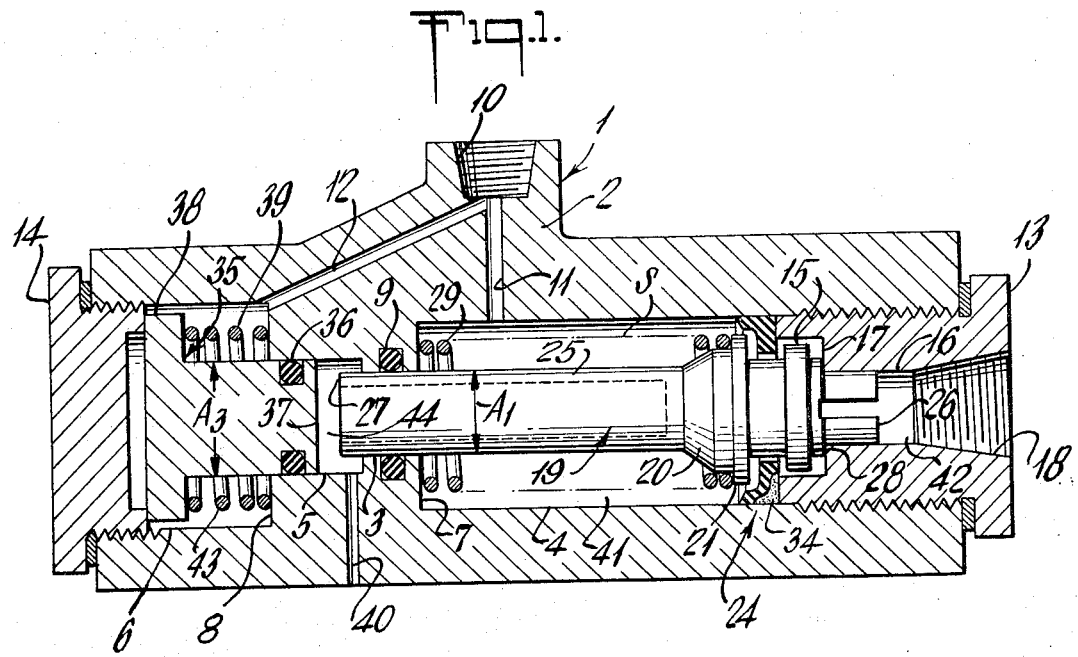
FIG. 1 is a sectional view showing a control valve embodying the present invention partially in cross-section.
Figure 2:
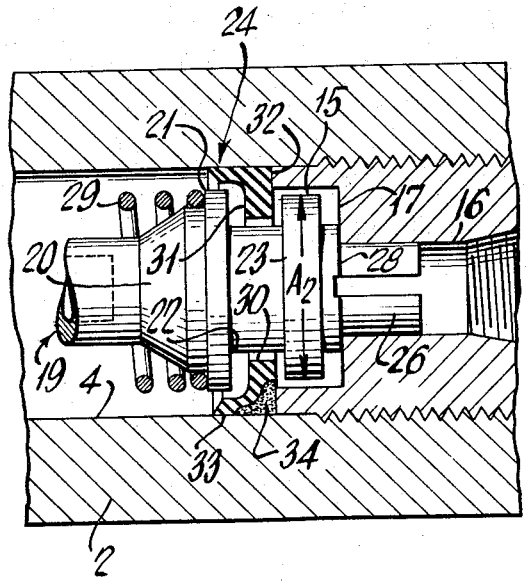
FIG. 2 is an enlarged fragmentary view of the proportioning piston in the control valve taken from FIG. 1.

Referring now to the drawings in detail and in particular to FIGS. 1 and 2, a hydraulic control valve 1 is provided with a housing 2 having a bore 3 therein axially interposed between a counterbore 4 and opposed stepped counterbores 5, 6, and annular shoulders 7, 8 are provided on said housing between said bore and counterbore 3, 4 and said stepped counterbores 5, 6, respectively, said bore having a seal 9 disposed therein. An inlet port 10 which is adapted for connection with a hydraulic master cylinder (not shown) is provided in the housing 2 being connected by branching passages 11, 12 with the counterbores 4, 6 adjacent to the shoulders 7, 8, respectively, and end plugs or closure members 13, 14 are threadedly received in the open ends of the counterbores 4, 6, respectively. The closure member 13 is provided with a pair of stepped bores 15, 16 having an annular shoulder 17 therebetween, and an outlet port 18 which is adapted for connection with the vehicle front axle brakes (not shown) is provided in said closure member connecting with the stepped bore 16.

A modulating, metering or proportioning means, such as the piston member indicated generally at 19, is provided with an annular head or metering portion 20 having an annular radial flange or retainer portion 21 thereon, and peripheral groove means 22 is provided in said head portion defining an annular metering or proportioning shoulder or valve member 23 for metering engagement with a cooperating seating member, such as the annular seating or cup member indicated generally at 24 and discussed hereinafter. The proportioning piston 19 is also integrally provided with opposed reduced portions or extension means 25, 26, and the leftward extension 25 extends coaxially through the housing bore and counterbore 3, 4 in sealing engagement with the seal 9 into the housing stepped counterbore 5 having a free or abutment end 27 terminating therein. The rightward extension 26 of the proportioning piston 19 is slidably and guidably received in the closure member bore 16, and an annular shoulder 28 is provided on said rightward extension for abutting engagement with the housing shoulder 17 to define the inoperative, static or at-rest position of said proportioning piston. A metering spring 29 is precompressed in abutting engagement between the proportioning piston retainer 21 and the housing shoulder 7, and said proportioning spring normally urges said proportioning piston toward its inoperative position engaging the extension shoulder 28 thereof with the closure member shoulder 17.

The seating member 24 is provided with a centrally located aperture 30 extending axially therethrough between opposed side portions 31, 32 of said seating member and radially spaced from the groove 22 of the proportioning piston 19. The seating member side 32 is normally seated in abutting engagement with the interior end of the closure member 13 and also defines a valve seat about the seating member aperture 30 for metering engagement with the metering valve member 23 of the proportioning piston 19. The seating member 24 is also provided with a peripheral lip 33 in sealing engagement with the housing counterbore 4, and a plurality of axially extending return flow passages 34 are provided between the seating member side 32 and lip 33, said return flow passages being normally closed by the sealing engagement of said lip with said housing counterbore.

A resiliently urged member, such as the drive piston indicated generally at 35, is slidably received in the housing stepped bore 5 having a peripheral seal 36 disposed therein and in sealing engagement with said housing stepped bore. The drive piston 35 is provided with a free or driving end 37 disposed in the housing stepped bore 5 for abutting or driving engagement with the free end 27 of the proportioning piston 19, and a radially extending flange 38 is integrally provided on the drive piston 35 in the housing counterbore 6. The drive piston flange 38 is normally urged toward abutting engagement with the interior end of the closure member 14 by the precompressive force of a spring 39 biased between said flange and the housing shoulder 8, and said spring force also normally urges the drive piston abutment end 37 toward a position in the housing counterbore 5 disengaged from the proportioning member abutment end 27, said housing counterbore 5 being vented to atmosphere through a vent passage 40 provided in the housing 2.

An inlet chamber 41 is defined in the housing counterbore 4 between the housing shoulder 7 and seating member 24 which is connected by the passage 11 in open pressure fluid communication with the inlet port 10, and an outlet chamber 42 is defined in the closure member stepped bores 15, 16 between said seating member and the outlet port 18, said inlet and outlet chambers being communicated through the seating member aperture 30. Another inlet chamber 43 is defined in the housing counterbore 6 between the housing shoulder 8 and the closure member 14 which is connected in open pressure fluid communication with the inlet port 10 and the inlet chamber 41 by the passage 12, and an atmospheric chamber 44 is defined in the housing counterbore between the engagement of the seal 9 with the proportioning piston extension 25 and the engagement of the piston seal 36 with said housing counterbore, said atmospheric chamber being axially interposed between the inlet chambers 41, 43.

The sealing engagement of the proportioning piston extension 25 with the housing seal 9 defines an effective closing area $A_1$ for subjection to the fluid pressure at the inlet and outlet ports 10, 18, and the sealing engagement of the proportioning piston valve member 23 with the seating member valve seat 32 defines an effective area $A_2$ on said proportioning piston for subjection to the fluid pressure at said outlet port as described hereinafter, said area $A_2$ being predeterminately greater than the area $A_1$. The sealing engagement of the seal 36 on the drive piston 35 with the housing stepped bore 5 defines another effective area $A_3$ opposed to the area $A_2$ for subjection to the fluid pressure at the inlet port 10, and the additive areas $A_3$ and $A_2 - A_1$ are at least equal to or greater than the area $A_2$.

OPERATION

In the operation with the component parts of the control valve 1 positioned as shown in the drawings and as described hereinbefore, a supplied or input fluid or hydraulic pressure P delivered to the inlet port 10 of said control valve from the master cylinder (not shown) connected therewith flows through the passage 11, the counterbore 4, the seating member aperture 30 and the stepped bores 15, 16 of the closure member 3 to establish an output or applied fluid or hydraulic pressure Po at the outlet port 17 for delivery to the vehicle front axle brakes (not shown). At the same time, the supplied fluid pressure P also flows from the inlet port 10 through the branching passage 12 into the housing counterbore 6.

Figure 3:
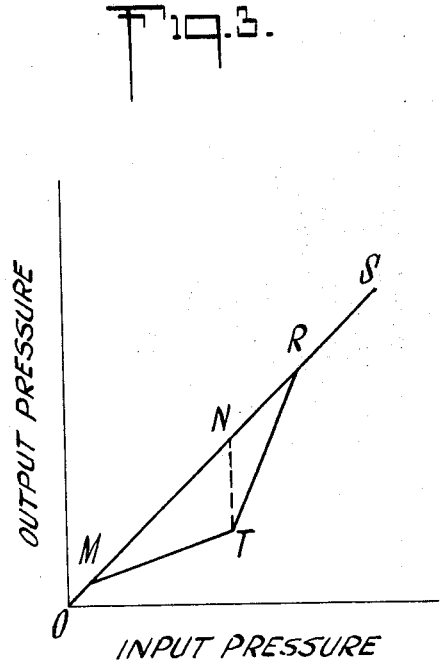
FIG. 3 is a graphical representation illustrating the applied or output fluid pressure effected by the control valve of FIG. 1 in response to the supplied or input fluid pressure as compared with a theoretical or ideal curve.

The supplied fluid pressure P acts on the effective closing area $A_1$ of the proportioning piston 19 to establish a closing force $P A_1$ tending to urge said proportioning piston against the compressive force Fc of the proportioning spring 29; however, the proportioning spring force Fc opposes movement of said proportioning piston until the supplied and applied fluid pressures P, Po attain a predetermined value M, as shown on the line OR in the graph of FIG. 3.

When the predetermined value M of the supplied fluid pressure P is attained, the closing force $P A_1$ overcomes the proportioning spring force Fc, and in this manner, the proportioning piston 19 is moved leftwardly toward an isolating position engaging the valve member 23 thereof with the seating member valve seat 32; therefore, the engagement of said proportioning piston valve member with said seating member valve seat interrupts pressure fluid communication between the inlet and outlet ports 10, 18, respectively. Upon the engagement of the proportioning piston valve member 23 with the seating member valve seat 32, the supplied fluid pressure P acts on the effective input area $A_2 - A_1$ of the proportioning piston 19 to establish an input force $P (A_2 - A_1)$ which is additive to the proportioning spring force Fc to substantially balance the opposed output force $Po A_2$ established by the applied fluid pressure Po at the outlet port 18 acting on the effective output area $A_2$ of said proportioning piston.

From the graphical representation in FIG. 3, it is obvious that an increase in the magnitude of the supplied fluid pressure P in excess of the predetermined value M, as shown on the line OS, will result in proportionally reduced increases in the applied fluid pressure Po, as shown by the line MT. For instance, when the supplied fluid pressure P is increased to a value in excess of the predetermined value M but less than the predetermined value N, the input force $P (A_2 - A_1)$ is correspondingly increased and additive to the proportioning spring force Fc to overcome the output force Po A$_2$; therefore, the proportioning piston 19 is moved in a rightwardly direction toward a metering position disengaging the valve member 23 thereof from the seating member valve seat 32 to effect a metered application of the supplied fluid pressure from the housing counterbore 4 through the seating member aperture 30 and the stepped bores 15, 16 of the closure member 13 to the outlet port 18 to effect a proportional increase of the applied fluid pressure Po at the outlet port 18 in a predetermined ratio with the supplied fluid pressure P at the inlet port 10, s shown by the line MS in the graph of FIG. 3 wherein:

$$Po = [P (A_2 - A_1) + Fc]/[A_2].$$

Of course, the increased applied fluid pressure Po effects a corresponding increase in the output force Po A$_2$, and when the increased output force Po A$_2$ attains an increased value substantially equal to that of the increased input force $P (A_2 -_{A1})$ and the additive proportioning spring force Fc, the proportioning piston 19 is again moved toward its isolating position to re-engage the valve member 23 with the seating member valve seat 32 to again isolate the increased supplied and applied fluid pressures P, Po. It is, of course, obvious that the proportioning piston 19 will be responsive to further increases in the supplied fluid pressure P to effect further corresponding proportional increases in the applied fluid pressure Po in the same manner as previously described above until the supplied and applied fluid pressures P, Po respectively attain the predetermined values N and T.

The supplied fluid pressure P in the housing counterbore 6 acting on the effective area A$_3$ of the drive piston 35 establishes a rightwardly directed force P A$_3$ urging the piston free end 37 toward driving engagement with the proportioning piston free end 27, but the compressive force Fs of the spring 39 maintains the piston 35 engaged with the closure member 14 until the magnitude of the supplied fluid pressure attains the predetermined value N. When the supplied fluid pressure P at the inlet port 10 attains the predetermined value N, the force P A$_3$ overcomes the spring force Fs moving the piston free end 37 into driving or abutting engagement with the proportioning piston free end 27 wherein the force Po A$_3$ - Fs is thereafter additive to the input force $P (A_2 - A_1)$ acting on the proportioning piston 19. From the graphical representation in FIG. 3, it is obvious that further increases in the magnitude of the supplied fluid pressure in excess of the predetermined value N as shown on the line OS will result in a proportionally increasing increase in the output fluid pressure P o as shown by the line TR. For instance, when the supplied fluid pressure is increased to a value in excess of the predetermined value N, but less than the predetermined value R, the additive input forces P $(A_2 - A_1)$, P A$_3$ are correspondingly increased and additive to the spring force Fc to overcome the output force Po A$_2$ and the additive spring force Fs; therefore, the piston 35 and proportioning piston 19 are concertedly movable in a rightward direction toward a metering position disengaging the proportioning piston valve member 23 from the seating member valve seat 32 to effect a further metered application of the supplied fluid pressure and establish a proportional increase of the applied fluid pressure Po at the outlet port 18, as previously described, but in another predetermined ratio with the supplied fluid pressure P at the inlet port 10, as shown by the line RT in the graph of FIG. 2 wherein:

$$Po = [P (A_2 - A_1 + A_3) + Fc - Fs].$$

When the supplied and applied fluid pressures P, Po respectively at the inlet and outlet ports 10, 18 attain the predetermined value R, the additive input forces P A$_3$, $P (A_2 - A_1)$ and the metering spring force Fc overcome the opposed additive output and spring forces Po A$_2$, Fc to concertedly urge the proportioning piston 19 and piston 35 rightwardly toward the inoperative position of said proportioning piston engaging the shoulder 28 thereof with the closure member shoulder 17 to establish open pressure fluid communication through the seating member aperture 30 between the inlet and outlet ports 10, 18 and blend the input and output fluid pressures P, Po, as shown by the line RS in the graph of FIG. 2.

From the foregoing, it is now apparent that a novel control valve 1 meeting the objects and advantageous features set forth hereinbefore, as well as others, is disclosed and that changes as to the precise configurations, shapes and details of the construction set forth in the disclosure by way of illustration may be made by those skilled in the art without departing from the spirit of the invention.

The embodiments of the invention in which an exclusive property or privilege is claimed are defined as follows:

1. A hydraulic control valve comprising a housing having a pressure fluid flow passage therethrough, an atmospheric chamber in said housing, a valve seat engaged with said housing about said flow passage, a proportioning piston movable in said flow passage including a valve member for engagement with said valve seat to control the application through said flow passage of fluid pressure supplied thereto, an extension on said proportioning piston having a free end portion movable in said atmospheric chamber, and a proportioning spring engaged with said proportioning piston and normally urging said proportioning piston toward an operative position in said housing disengaging said valve member from said valve seat, said proportioning piston being initially movable from its inoperative position in response to the supplied and applied fluid pressures acting thereon of a first predetermined value against the force of said proportioning spring toward an isolating position in said flow passage engaging said valve member with said valve seat to isolate the supplied and applied fluid pressures and said proportioning piston being thereafter further movable in response to increases in the supplied fluid pressure in excess of the first predetermined value and less than a second predetermined value predeterminately greater than said first predetermined value acting thereon and assisted by the force of said proportioning spring toward a metering position in said flow passage disengaging said valve member from said valve seat to effect a metered increase in the applied fluid pressure in a first predetermined ratio with the supplied fluid pressure between said first and second predetermined values, another piston movable in said housing and subjected to the supplied fluid pressure including another free end portion movable in said atmospheric chamber for abutting engagement with said first named free end portion, and another spring engaged with said other piston and normally urging it toward an inoperative position disengaging said other free end portion from said first named free end portion, said other piston being movable from its inoperative position in response to supplied fluid pressure acting thereon in excess of said second predetermined value against the force of said other spring to engage said other free end portion with said first named free end and assist the actuation of said proportioning piston in response to supplied fluid pressures in excess of the second predetermined value and less than a third predetermined value predeterminately greater than said second predetermined value to effect the metered increase in the applied fluid pressure in another predetermined ratio with the supplied fluid pressure between the second and third predetermined values, and said proportioning and other pistons being further movable in response to supplied fluid pressure in excess of the third predetermined value acting thereon and respectively assisted and opposed by the forces of said first named and other springs toward the inoperative position of said proportioning piston in said housing to blend the supplied and applied fluid pressures.

2. A hydraulic control valve according to claim 1, comprising a first effective area on said proportioning piston subjected to the supplied fluid pressure, and a second effective area on said proportioning piston opposed to said first area and subjected to the applied fluid pressure, said second area being predeterminately greater than said first area.

3. A hydraulic control valve according to claim 1, comprising an effective area on said other piston subjected to the supplied fluid pressure, said other piston being movable against the force of said other spring to engage said other free end portion with said first named end portion when the supplied fluid pressure acting on said area exceeds the second predetermined value.

4. A hydraulic control valve according to claim 2, comprising a third effective area on said other piston subjected to the supplied fluid pressure and being at least as great as the difference between said first and second areas, the force of the supplied fluid pressure in excess of the second predetermined value acting on said third area in opposition to the force of said other spring being additive to that of the supplied fluid pressure in excess of the second predetermined value acting on said first area upon the movement of said other end portion into engagement with said first named end portion in said atmospheric chamber.

5. A hydraulic control valve comprising a housing having inlet and outlet ports therein, an atmospheric chamber in said housing, a seating member engaged with said housing between said inlet and outlet ports including an aperture therethrough communicating said inlet and outlet ports, and a valve seat on said seating member about said aperture, a first piston movable in said housing between said inlet and outlet ports and extending through said aperture including a valve member for engagement with said valve seat, a first extension on said first piston extending into said atmospheric chamber, and a first abutment on said first extension within said atmospheric chamber, a first spring precompressed between said housing and first piston urging it toward an inoperative position disengaging said valve member from said valve seat to establish open pressure fluid communication between said inlet and outlet ports, first and second opposed areas on said first piston respectively subjected to the fluid pressures at said inlet and outlet ports and said second area being predeterminately greater than said first area, said first piston being initially movable from its inoperative position against the force of said first spring in response to fluid pressures at said inlet and outlet ports of a first predetermined value respectively acting on said first and second areas to engage said valve member with said valve seat interrupting pressure fluid communication between said inlet and outlet ports and said first piston also being thereafter further movable in response to fluid pressure at said inlet port in excess of the first predetermined value and less than a second predetermined value acting on said first area and assisted by the force of said first spring toward a metering position disengaging said valve member from said valve seat to establish metered pressure fluid communication between said inlet and outlet ports and effect a metered increase in the fluid pressure at said outlet port acting on said second area in a first predetermined ratio with the fluid pressure at said inlet port between said first and second predetermined values, a second piston movable in said housing and substantially axially aligned with said first piston including a second extension movable in said atmospheric chamber, a second abutment on said second extension within said atmospheric chamber and opposed to said first abutment for engagement therewith, and a third effective area on said piston at least as great as the difference between said first and second areas subjected to the fluid pressure at said inlet port and additive to said first area, and a second spring precompressed between housing and said second piston urging it toward an inoperative position disengaging said second abutment from said first abutment, said second piston being movable from its inoperative position against the force of said second spring in response to the fluid pressure at said inlet port in excess of the second predetermined value acting on said third area to engage said second abutment with said first abutment and assist the actuation of said first piston in response to the fluid pressure at said inlet port in excess of the second predetermined value and less than a third predetermined value and effect a further metered increase in the fluid pressure at the outlet port in a second predetermined ratio with the fluid pressure at said inlet port between said second and third predetermined values, and said first and second pistons being thereafter further movable in response to the fluid pressure at said inlet port in excess of the third predetermined value acting on said first and third areas and respectively assisted and opposed by the forces of said first and second springs toward the inoperative position of said first piston to blend the fluid pressures at said inlet and outlet ports.

6. A hydraulic control valve comprising a housing having a pair of inlet chambers therein, an atmospheric chamber in said housing between said inlet chambers, an outlet chamber in said housing communicating with one of said inlet chambers, proportioning valve means movable in said housing for performing fluid pressure proportioning operations between said one inlet chamber and said outlet chamber including extension means having abutment means thereon in said atmospheric chamber, said proportioning valve means being operable generally in response to fluid pressure in said one inlet chamber between first and second predetermined values to establish a proportionally reduced fluid pressure in said outlet chamber in a first predetermined ratio therewith, resiliently urged means movable in said housing between the other of said inlet chambers and said atmospheric chamber including other abutment means thereon in said atmospheric chamber for engagement with said first named abutment means, and passage means in said housing communicating said inlet chambers, said resiliently urged means being movable against its own force in response to fluid pressure in said inlet chambers in excess of the second predetermined value acting thereon to engage said second abutment means with said first abutment means assisting the proportioning operation of said proportioning valve means in response to fluid pressure in said inlet chambers between the second predetermined value and a third predetermined value to establish the proportionally reduced fluid pressure in said outlet chamber in a second predetermined ratio therewith, and said resiliently urged means and proportioning valve means being further movable in response to fluid pressure in said inlet chambers in excess of the third predetermined value acting thereon toward positions blending the fluid pressures in said inlet and outlet chambers.

* * * * *

UNITED STATES PATENT OFFICE
CERTIFICATE OF CORRECTION

Patent No. 3,760,841   Dated September 25, 1973

Inventor(s) Vernon M. Daffron

It is certified that error appears in the above-identified patent and that said Letters Patent are hereby corrected as shown below:

Column 4, line 23, "3" should read -- 13 --; line 25, "17" should read -- 18 --. Column 5, line 12, delete "s" and insert -- as --; line 46, "Po $A_3$ - Fs" should read -- P $A_3$ - Fs --. Column 6, line 4, "Po = [P $(A_2 - A_1 + A_3)$ + Fc - Fs]" should read -- Po = [P $(A_2 - A_1 + A_3)$ + Fc - Fs]/[$A_2$] --.

Signed and sealed this 23rd day of July 1974.

(SEAL)
Attest:

McCOY M. GIBSON, JR.
Attesting Officer

C. MARSHALL DANN
Commissioner of Patents